UNITED STATES PATENT OFFICE.

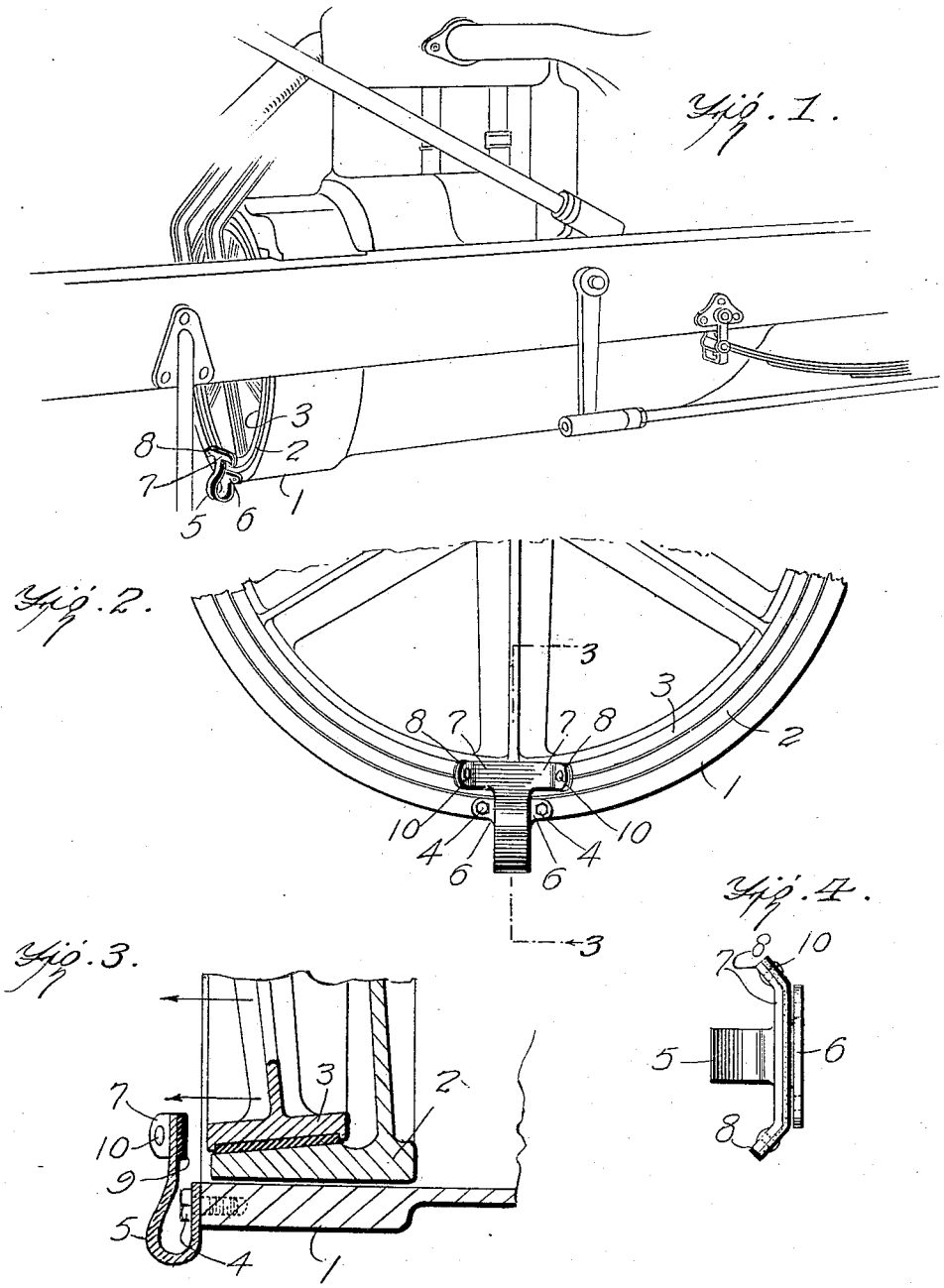

RONAYNE M. WALDRON, 2d, OF WASHINGTON, DISTRICT OF COLUMBIA.

AUTOMOBILE CONE-CLUTCH BRAKE.

1,215,750. Specification of Letters Patent. Patented Feb. 13, 1917.

Application filed July 17, 1916. Serial No. 109,842.

*To all whom it may concern:*

Be it known that I, RONAYNE M. WALDRON, 2d, a citizen of the United States, residing at Washington, in the District of Columbia, have invented certain new and useful Improvements in Automobile Cone-Clutch Brakes, of which the following is a specification.

The object of my invention is to provide an improved cone-clutch brake for automobiles, operating, when the clutch is disengaged from the fly-wheel, automatically to stop, instantly, the rotation of the former, thus facilitating shifting or changing gears and preventing injury thereto.

Another object is to provide a cone-clutch brake, of the character described, which will be extremely simple in construction and durable in use, and which may be readily applied to the automobile without any reorganization of the parts thereof, and which may be easily removed, when desired.

Another object is to provide such a cone-clutch brake which will not unduly increase the weight of the automobile, and which may be sold, separately, as an article of manufacture, and which will not require expert or skilled labor to install the same.

With these objects in view, and others appearing as the specification proceeds, and the nature of the invention more fully appears, the invention resides in the novel construction of the brake and its disposition relative to the clutch.

The invention is graphically portrayed in the accompanying drawing, which illustrates the preferred embodiment of my underlying ideas. In this drawing, like parts are designated by similar reference-characters throughout the several views. The several figures of the drawing may be briefly described as follows:

Figure 1 is a fragmentary perspective view of a portion of an automobile equipped with my improvement;

Fig. 2 is a fragmentary end elevation of the clutch and fly-wheel and the casing therefor, showing my cone-clutch brake installed;

Fig. 3 is a sectional view on the line 3—3, Fig. 2; and

Fig. 4 is a detail view, in top plan, of my clutch-brake.

Referring, now, in detail to the drawing:

1 designates the casing for the cone-clutch and fly-wheel, 2 the fly-wheel, and 3 the cone-clutch, these parts being of ordinary and well known construction in automobiles, such as the Stutz and other types.

Carried by the marginal, annular edge of the casing 1, as at 4, is my clutch-brake 5, advantageously comprising an elongated strip of somewhat springy or resilient material, preferably stout steel, presenting the requisite durability and strength and flexibility in use. The strip, at one end, carries perforated ears 6, 6, through which fastening screws 4 may pass, and by which the brake is removably secured to the casing 1. Intermediate of its length, the spring strip is bent, on a curve, forming a loop as shown. The free end or terminal of the strip is, as shown, positioned in the path of travel of the annular rim portion of the clutch 3, when it is rectilinearly moved, in the direction of the arrows in Fig. 3, so as to disengage it from the fly-wheel 2. The free end of the spring strip is provided with ears 7, 7, the outer ends 8 of which are bent, as shown, in a direction away from the casing 1. A wear-facing 9 is preferably removably secured to the free end of the strip, as shown at 10, 10. It will thus be noted that my clutch-brake comprises a resilient, metallic member provided with a basal portion adapted to be secured to a support (as, for instance, the fly-wheel casing), and with a bowed or looped portion, and with a terminal arranged in the path of rectilinear movement of the clutch, so as to be engaged thereby.

It will be understood, of course, that, while I have hereinabove described my brake as used in connection with a cone-clutch, this is merely an illustratory exemplification of one form of use, and that it is equally adapted for use in connection with any revoluble and rectilinearly-movable clutch, whether it be of the type known as a "cone-clutch," or any other form.

It is also to be understood that the expression "bowed or looped" used in the specification and claims, in describing the construction of the brake, is not to be interpreted as defining an alternative construction, the words "bowed" and "looped," as here used, being intended to be synonymous.

In operation, when the clutch 3 is moved to release it from the fly-wheel 2, it is brought forcibly against the free end of the brake 5, which, by reason of its resiliency, acts as a cushion, and, at the same time, instantly stops rotary or spinning movement of the clutch on the shaft on which it is slidably mounted.

Having thus fully described my invention, the many advantages thereof will be apparent, especially to those skilled in the art to which it pertains.

Modifications in detail may be resorted to, within the scope of the appended claims, without departing from the spirit of the invention, or necessarily sacrificing any of its advantages.

Having thus fully described my invention, what I claim as new and desire to secure by Letters Patent of the United States is:

1. In an automobile, the combination, with a revoluble and rectilinearly-movable clutch, of a clutch-brake supported adjacent said clutch and comprising a resilient, metallic member provided with a basal portion adapted to be secured to a support, and with a bowed or looped portion, and with a terminal arranged in the path of rectilinear movement of said clutch, so as to be engaged thereby.

2. An automobile clutch brake, adapted to be secured to an automobile fly-wheel casing, comprising a resilient, metallic member provided, at one end, with ears bent at an angle to the plane thereof, and a wear-facing secured to said ears.

3. An automobile clutch brake, adapted to be secured to an automobile fly-wheel casing, comprising a resilient, metallic member bent, intermediate its ends, on a curve, forming a loop, and provided, at one end, with ears bent at an angle to the plane thereof, and a wear-facing secured to said ears.

In testimony whereof, I affix my signature in the presence of two witnesses.

RONAYNE M. WALDRON, 2D.

Witnesses:
CHARLES F. BISHOP,
AMY ROBERTSON.

Copies of this patent may be obtained for five cents each, by addressing the "Commissioner of Patents, Washington, D. C."